(12) United States Patent
Zeng

(10) Patent No.: US 11,712,864 B2
(45) Date of Patent: Aug. 1, 2023

(54) FOOTWEAR ARTICLE FORMING PROCESS, AND DEVICE FOR SAME

(71) Applicant: HONESTY RUBBER & PLASTIC MFG CO., LTD, Guangdong (CN)

(72) Inventor: Jiaming Zeng, Guangdong (CN)

(73) Assignee: HONESTY RUBBER & PLASTIC MFG CO., LTD, Guangdong (CN)

( * ) Notice: Subject to any disclaimer, the term of this patent is extended or adjusted under 35 U.S.C. 154(b) by 243 days.

(21) Appl. No.: 16/760,037

(22) PCT Filed: Dec. 7, 2017

(86) PCT No.: PCT/CN2017/114907
§ 371 (c)(1),
(2) Date: Apr. 29, 2020

(87) PCT Pub. No.: WO2019/085144
PCT Pub. Date: May 9, 2019

(65) Prior Publication Data
US 2020/0262166 A1   Aug. 20, 2020

(30) Foreign Application Priority Data
Nov. 1, 2017 (CN) .......................... 201711059114.3

(51) Int. Cl.
*B29D 35/00* (2010.01)
*B29C 45/26* (2006.01)
(Continued)

(52) U.S. Cl.
CPC ...... *B29D 35/0036* (2013.01); *B29C 44/1214* (2013.01); *B29C 45/1635* (2013.01);
(Continued)

(58) Field of Classification Search
CPC .............. B29D 35/0036; B29D 35/084; B29D 35/082; B29C 45/2675; B29C 45/2673; B29C 2045/2679
See application file for complete search history.

(56) References Cited

U.S. PATENT DOCUMENTS 2,566,686 A * 9/1951 Vlcek ................ B29D 35/0081
12/15.1
3,447,251 A * 6/1969 Drexler ................ B29D 35/065
425/119
(Continued)

FOREIGN PATENT DOCUMENTS

CN   104985755 A   10/2015
CN   107672203 A   2/2018
(Continued)

OTHER PUBLICATIONS

Translation of CN 104985755 ("Tu") (Year: 2015).*
(Continued)

*Primary Examiner* — Xiao S Zhao
*Assistant Examiner* — John J DeRusso
(74) *Attorney, Agent, or Firm* — Yue (Robert) Xu; Apex Attorneys at Law, LLP

(57) ABSTRACT

A footwear article forming process, and a device for the same are disclosed. The process includes: providing a forming mold set including an outer modular mold, an inner formation mold, and a footwear-forming space therebetween. The footwear-forming space comprises a footwear lower portion forming space and a footwear main portion forming space. Footwear article forming steps are as follows: injecting a pre-determined amount of a footwear main portion rubber material into a footwear main portion sprue channel, the footwear main portion rubber material being injected from a footwear main portion rubber injection opening into the footwear main portion forming space via a transfer injection channel; and placing a footwear lower portion rubber material into the footwear lower portion forming space.

4 Claims, 3 Drawing Sheets

(51) Int. Cl.
  *B29C 45/16* (2006.01)
  *B29D 35/14* (2010.01)
  *B29D 35/04* (2010.01)
  *B29L 31/50* (2006.01)
  *B29C 44/12* (2006.01)
  *B29D 35/10* (2010.01)

(52) U.S. Cl.
  CPC ...... *B29C 45/2675* (2013.01); *B29D 35/0081* (2013.01); *B29D 35/04* (2013.01); *B29D 35/10* (2013.01); *B29D 35/148* (2013.01); *B29L 2031/50* (2013.01)

(56) References Cited

U.S. PATENT DOCUMENTS

| 3,635,618 | A | * | 1/1972 | Hernandez | B29D 35/0027 425/395 |
| 5,193,240 | A | * | 3/1993 | Salpietro | B29D 35/082 12/146 B |
| 6,045,733 | A | | 4/2000 | Chu et al. | |
| 6,168,741 | B1 | * | 1/2001 | Foldes | A43B 1/0027 425/577 |

FOREIGN PATENT DOCUMENTS

| FR | 2571300 | A1 | 4/1986 |
| FR | 2682860 | A1 | 4/1993 |
| JP | H10193477 | A | 7/1998 |
| JP | 2005138413 | A | 6/2005 |
| JP | 2015093441 | A | 5/2015 |
| WO | 9404336 | A1 | 3/1994 |

OTHER PUBLICATIONS

International Search Report for PCT/CN2017/114907 dated Jul. 6, 2018, ISA/CN.
CNIPA First Office Action corresponding to Application No. 201711059114.3; issued Feb. 3, 2019.
CNIPA Second Office Action corresponding to Application No. 201711059114.3; dated Sep. 24, 2019.

* cited by examiner

FOOTWEAR ARTICLE FORMING PROCESS, AND DEVICE FOR SAME

The present application is the national phase of International Application No. PCT/CN2017/114907, titled "FOOTWEAR ARTICLE FORMING PROCESS, AND DEVICE FOR SAME", filed on Dec. 7, 2017, which claims the benefit of priority to Chinese Patent Application No. 201711059114.3, titled "FOOTWEAR ARTICLE FORMING PROCESS, AND DEVICE FOR SAME", filed with the China National Intellectual Property Administration on Nov. 1, 2017, both of which are incorporated herein by reference.

FIELD

The present application relates to the technical field of articles for daily use, in particular to a footwear forming process and a device for the same.

BACKGROUND

Since ancient times, footwear has always been an indispensable article for daily use, such as rain boots that are waterproof in rainy days. In modern times, due to the development of economy and the improvement of life technology, people's requirements for the appearance and performance of footwear have also gradually improved. Some waterproof integrally-formed footwear are widely used, most of which are plastic shoes or rubber shoes.

In the conventional technology, due to technical limitations of the injection molding process, rubber products cannot be produced by injection. Therefore, most of the rubber shoes on the market are produced by the conventional vulcanization process and mold pressing process.

SUMMARY

An object of the present application is to provide a footwear forming process and a device therefor, so as to overcome the disadvantage that rubber shoes cannot be produced by injection in the conventional technology.

To achieve the above object, the following technical solutions are provided in the present application.

A footwear forming process includes:

a set of forming mold is provided and installed in an injection molding machine; the forming mold includes an outer combined mold and an inner shaping mold, and the inner shaping mold is controllably placed in the outer combined mold; a footwear forming space is formed between the outer combined mold and the inner shaping mold, and the footwear forming space includes a footwear sole forming space and a footwear body forming space;

a footwear body feed channel is provided in the forming mold, the footwear body feed channel includes a footwear body rubber injection port, and the footwear body rubber injection port is in communication with the footwear forming space;

the footwear forming process includes:

1) rubber injection: injecting a predetermined amount of footwear body rubber into the footwear body feed channel, wherein the footwear body rubber is injected into the footwear body forming space from the footwear body rubber injection port through a transfer injection channel; and then placing footwear sole rubber into the footwear sole forming space;

2) mold closing: performing a mold closing operation to close the forming mold, wherein the rubber in the footwear forming space is vulcanized and cross-linked to form a molded footwear body;

3) mold opening: performing a mold opening operation to open the forming mold; moving the inner shaping mold downward to separate the molded footwear body from the outer combined mold;

4) rubber unsticking: blowing air into the forming mold to bring about gaps between the molded footwear body and the outer combined mold and between the molded footwear body and the inner shaping mold; and 5) demoulding: separating the molded footwear body from the inner shaping mold to obtain a finished product.

Optionally, in the provision of a set of forming mold, a partition plate is provided in the outer combined mold, which is slidably connected with the outer combined mold; and the transfer injection channel is provided in the partition plate, which includes a transfer injection inlet and a transfer injection outlet; when the partition plate is placed between the footwear body forming space and the footwear sole forming space, the transfer injection inlet is in communication with the footwear body rubber injection port, and the transfer injection outlet is in communication with the footwear body forming space.

Optionally, in a case that different rubber materials are used for the footwear body and the footwear sole, the step of rubber injection is as follows:

placing the partition plate between the footwear body forming space and the footwear sole forming space, injecting a predetermined amount of footwear body rubber into the footwear body feed channel, wherein the footwear body rubber is injected into the footwear body forming space from the footwear body rubber injection port through the transfer injection channel; then drawing out the partition plate, and placing footwear sole rubber into the footwear sole forming space.

Optionally, in a case that the same rubber material is used for the footwear body and the footwear sole, the step of rubber injection is as follows:

drawing out the partition plate from between the footwear body forming space and the footwear sole forming space, so that the footwear body forming space is in communication with the footwear sole forming space to form the footwear forming space; injecting a predetermined amount of footwear rubber into the footwear body feed channel, wherein the footwear rubber is injected into the footwear forming space from the footwear body rubber injection port through the footwear body feed channel, so that the footwear body forming space and the footwear sole forming space are filled with the footwear rubber.

Optionally, when the partition plate is placed in the footwear body forming space and sole forming space, the partition plate is in contact with the inner shaping mold, and a positioning member on the partition plate clamps and secures the inner shaping mold.

Optionally, in the step of rubber injection, the footwear body rubber injection port is in communication with the footwear forming space at the junction of the footwear body forming space and the footwear sole forming space.

Optionally, the injection molding machine further includes a rubber injection device for rubber injection;

before the step of rubber injection, the rubber is first heated in the rubber injection device to be softened;

in the step of rubber injection, the footwear body rubber is injected into the footwear body forming space by the rubber injection device, and the footwear sole rubber is placed into the footwear sole forming space by manual operation; and the material and color of the footwear body rubber may be the same as or different from that of the footwear sole rubber.

Optionally, in the provision of a set of forming mold, the forming mold is split into a first inner mold and a second inner mold, wherein the first inner mold is fixedly mounted to the outer combined mold, and the second inner mold is slidably connected with the first inner mold; and the injection molding machine is provided with an oil cylinder which is connected with the second inner mold and configured to drive the second inner mold.

In the step of mold opening, the second inner mold is driven to slide away from the first inner mold by the oil cylinder, so as to drive the molded footwear body away from the first inner mold and the outer combined mold.

A footwear forming device is further provided according to the present application, which includes an injection molding machine, and further includes:

a set of forming mold mounted in the injection molding machine, wherein the forming mold including an outer combined mold and an inner shaping mold; wherein the inner shaping mold is placed in the outer combined mold, a footwear forming space is formed between the outer combined mold and the inner shaping mold, and the footwear forming space includes a footwear sole forming space and a footwear body forming space; and a footwear body feed channel is provided in the forming mold, the footwear body feed channel includes a footwear body feed port, and the footwear body feed port is in communication with the footwear forming space.

Optionally, the footwear forming device further includes a partition plate for separating the footwear body forming space from the footwear sole forming space; the partition plate is movably connected with the outer combined mold, and can be inserted between the footwear body forming space and the footwear sole forming space for separation; and a transfer injection channel is provided in the partition plate, which includes a transfer injection inlet and a transfer injection outlet; when the partition plate is an isolation state, the transfer injection inlet is in communication with the footwear body feed port, and the transfer injection outlet is in communication with the footwear body forming space.

Optionally, the outer combined mold is provided with a driving member for driving the partition plate; and the driving member is configured to drive the partition plate to be drawn out from between the footwear body forming space and the footwear sole forming space to merge the footwear body forming space with the footwear sole forming space.

Optionally, the partition plate is further provided with a positioning member which matches the bottom of the inner shaping mold; and when the partition plate is in the isolation state, the partition plate is in contact with the inner shaping mold, and the positioning member on the partition plate is tightly fitted with the inner shaping mold.

Optionally, the footwear forming device further includes an oil cylinder mounted on the top of the injection molding machine, and the oil cylinder is connected with the inner shaping mold and configured to drive the inner shaping mold; the oil cylinder causes the inner shaping mold and the outer combined mold to perform mold closing and mold opening operations by controlling the inner shaping mold.

Optionally, the shape of the inner shaping mold simulates the lower leg of a human body and the following part, and the inner shaping mold includes a first inner mold and a second inner mold; the first inner mold and the second inner mold are divided back-forth; wherein the first inner mold includes a part simulating the calf and the heel of a human body, and the second inner mold includes a part simulating the forefoot of a human body; and the first inner mold is fixedly mounted to the outer combined mold, and the second inner mold is slidably connected with the first inner mold.

The present application has the following advantages.

With the footwear forming process and the device therefor provided by the present application, rubber materials can be used to manufacture products by the injection machine, and rubber products that meet the appearance and quality requirements can thereby be obtained. The production quality and efficiency are improved, and market demands are met.

BRIEF DESCRIPTION OF THE DRAWINGS

In order to more clearly illustrate technical solutions in embodiments of the present application or in the conventional technology, the drawings to be used in the description of the embodiments or the conventional technology are briefly described below. Apparently, the drawings in the following description show only some embodiments of the present application, and other drawings may be obtained by those skilled in the art from the drawings without any creative work.

DETAIL DESCRIPTION OF THE EMBODIMENTS

In order to make the objectives, features and advantages of the present application more apparent and easier to be understood, the technical solutions according to the embodiments of the present application will be described clearly and completely as follows in conjunction with the drawings in the embodiments of the present application. It is apparent that the described embodiments are only a few rather than all of the embodiments according to the present application. Any other embodiments obtained by those skilled in the art based on the embodiments in the present application without any creative work fall in the protection scope of the present application.

First Embodiment

Figure 1:
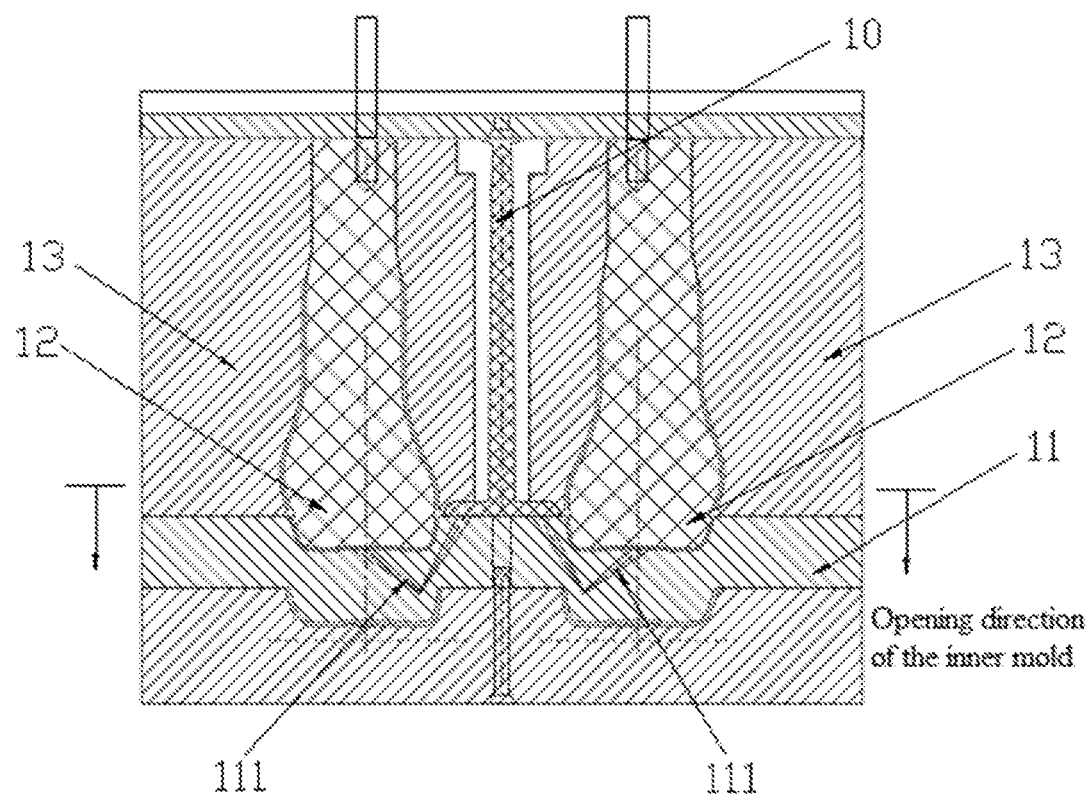
FIG. 1 is a schematic structural view of a footwear forming device according to a first embodiment of the present application.

Referring to FIG. 1, FIG. 1 is a schematic structural view of a footwear forming device according to an embodiment of the present application.

This embodiment of the present application provides a footwear forming device, which includes an injection molding machine, an upper hot plate and a lower hot plate mounted on the injection molding machine, and a set of forming mold mounted between the upper hot plate and the lower hot plate.

The forming mold includes an outer combined mold 13 and an inner shaping mold 12. The inner shaping mold 12 is controllably placed in the outer combined mold 13 to form a footwear forming space. Rubber is injected into the footwear forming space to realize the forming of the footwear body.

In the present embodiment, the footwear forming space includes a footwear sole forming space and a footwear body forming space. In the initial state, the footwear sole forming space is in communication with the footwear body forming space.

In the present embodiment, a footwear body feed channel 10 is provided in the forming mold, the footwear body feed channel 10 includes a footwear body feed port, and the footwear body feed port is in communication with the footwear body forming space.

The footwear forming device further includes a partition plate 11 for separating the footwear body forming space from the footwear sole forming space. The partition plate 11 is movably connected with the outer combined mold, and can be inserted between the footwear body forming space and the footwear sole forming space. When the partition plate 11 is in an isolation state, the footwear body forming space is isolated from the footwear sole forming space.

A transfer injection channel 111 is provided in the partition plate 11, which includes a transfer injection inlet and a transfer injection outlet; when the partition plate is the isolation state, the transfer injection inlet is in communication with the footwear body feed port, and the transfer injection outlet is in communication with the footwear body forming space. The footwear body rubber is injected into the footwear body forming space through the footwear body feed channel 10 and the transfer injection channel 111. In this case, the rubber inlet is located between the footwear body and the footwear sole. After the footwear body is formed, the rubber inlet is hidden, thereby achieving the purpose of hiding the rubber inlet.

The partition plate 11 is configured to isolate the footwear body forming space from the footwear sole forming space, which facilitates manufacture of footwear with the footwear body and the footwear sole having different colors and materials. In a case that the same material is used for the footwear body and the footwear sole, the partition plate 11 can be drawn out to make the footwear forming space a continuous whole space, so that the same footwear rubber is injected into the footwear forming space to produce the integrally-formed footwear with the footwear body and the footwear sole having the same material.

In order to allow the partition plate 11 to be stably inserted and withdrawn to avoid affecting the product quality, the outer combined mold 13 is provided with a driving member for driving the partition plate 11. The driving member is configured to drive the partition plate 11 to be drawn out from between the footwear body forming space and the footwear sole forming space to merge the footwear body forming space with the footwear sole forming space.

In the present embodiment, the partition plate 11 is further provided with a positioning member which matches the bottom of the inner shaping mold 12.

When the partition plate 11 is in the isolation state, the partition plate 11 is in contact with the inner shaping mold 12, and the positioning member on the partition plate 11 is tightly fitted with the inner shaping mold 12, so that the inner shaping mold 12 can be clamped and secured.

In addition, the injection molding machine further includes a rubber injection device. In the present embodiment, the rubber injection device includes an injection bracket, a feed screw rod, a feed tube, an injection head, an injection oil cylinder, and a refrigerant system. In order to facilitate the cooling of the feed screw rod by the refrigerant system, the feed screw rod is designed as a hollow structure, and inserted into the footwear body feed channel 10.

During the footwear molding process, the hot-melt rubber is injected into the footwear forming space by the rubber injection device, so that the footwear forming space is filled with the rubber. After the rubber is vulcanized and shaped in the footwear forming space, the rubber is cured in the footwear forming space to form integrated footwear including the footwear sole and the footwear body.

The rubber can be divided into footwear body rubber and footwear sole rubber according to the molding method.

In the present embodiment, an oil cylinder is provided on the top of the injection molding machine, which is configured to control the inner shaping mold 12. The oil cylinder causes the outer combined mold 13 and the inner shaping mold 12 to perform mold closing and mold opening operations by controlling the inner shaping mold 12.

Since the weight of the molds used for a pair of footwear can reach 800 kg in the manufacturing process of the footwear, the driving device in the conventional technology cannot bear the weight of the molds of a pair of footwear at one time, so it is impossible to perform molding operations for a pair of footwear at one time. While the oil cylinder can drive the inner shaping mold 12 having a large weight, so that a pair of footwear can be produced at one time.

In addition, with the oil cylinder driving the inner shaping mold 12, compared with other injection machines in the conventional technology, the injection molding machine used in the embodiments of the present application has a lower height, a simpler structure, which saves space.

In the manufacturing process of the integrally formed footwear, due to the limitation of the mold, it is generally impossible to produce a footwear heel having curvature.

In order to solve this technical problem, in the present embodiment, the shape of the inner shaping mold 12 is designed as the simulation of the lower leg of a human body and the following part, which includes a first inner mold and a second inner mold.

The first inner mold and the second inner mold are divided back-forth; wherein the first inner mold includes a part simulating the calf and the heel of a human body, and the second inner mold includes a part simulating the forefoot of a human body.

The first inner mold is fixedly mounted to the outer combined mold, and the second inner mold is slidably connected with the first inner mold.

In the present embodiment, the oil cylinder is connected to the second inner mold, and the second inner mold can be driven by the oil cylinder to move downward with respect to the first inner mold, thereby avoiding the situation that the protruding curvature of the heel in the first inner mold gets stuck in the outer combined mold 13.

Second Embodiment

Figure 2:
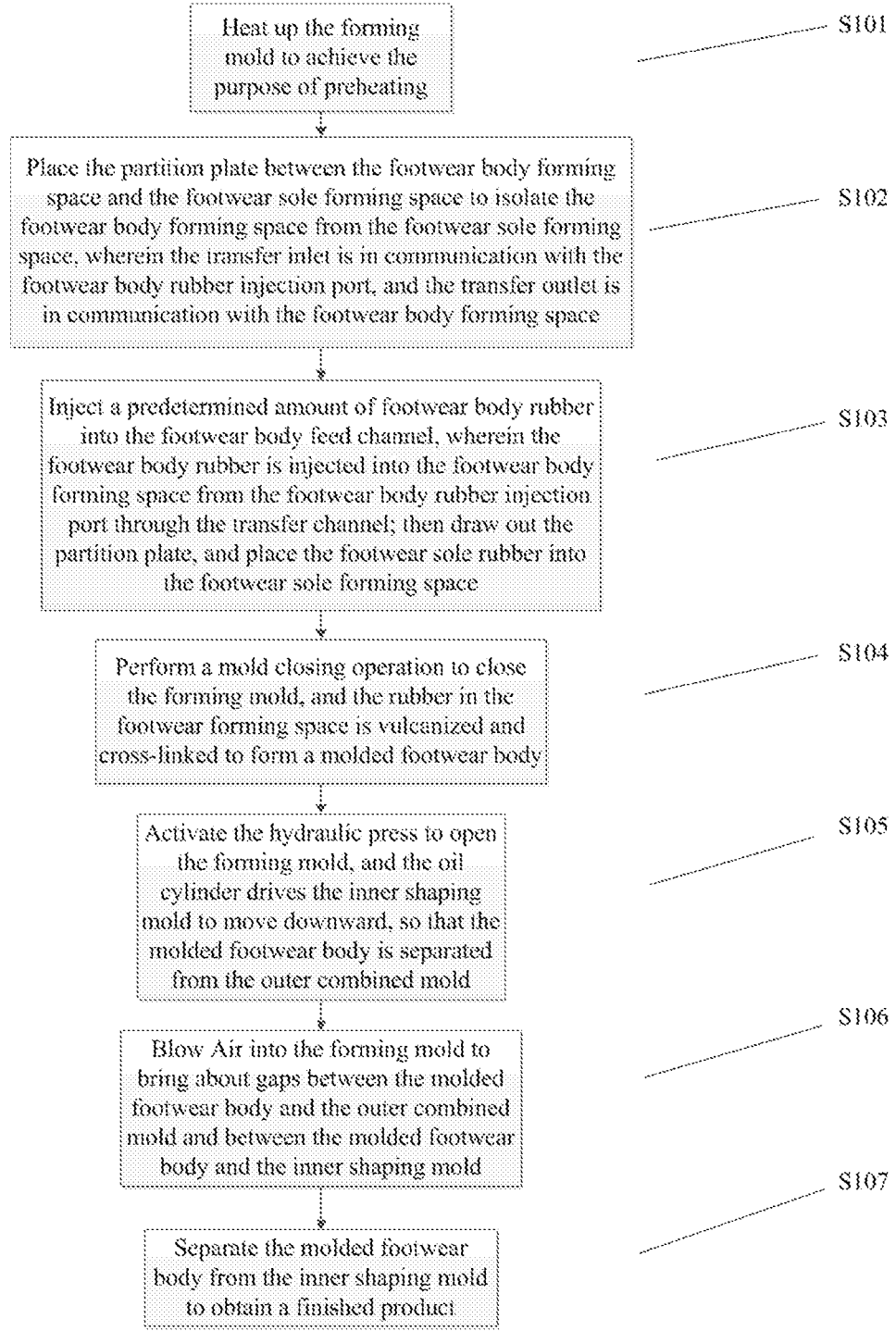
FIG. 2 is a flow chart of a footwear forming process according to a second embodiment of the present application.

Referring to FIG. 2, FIG. 2 is a flow chart of a footwear forming process according to an embodiment of the present application.

Based on the above embodiment, in the present embodiment, the footwear forming process includes the following steps:

S101, Preheating

The forming mold is heated up to achieve the purpose of preheating.

The injection molding machine is activated, and the forming mold is heated by the upper hot plate and the lower hot plate within a predetermined time to achieve the purpose of preheating, so as to facilitate the smooth proceeding of subsequent processing procedures.

S102, Isolation

The partition plate 11 is placed between the footwear body forming space and the footwear sole forming space to isolate the footwear body forming space from the footwear sole forming space, the transfer injection inlet is in communication with the footwear body rubber injection port, and the transfer injection outlet is in communication with the footwear body forming space.

A switch that controls the driving member is pressed, and by controlling the partition plate 11, the driving member pushes the partition plate 11 into between the footwear body forming space and the footwear sole forming space to isolate the footwear body forming space from the footwear sole forming space.

In the process of rubber injection, the inner shaping mold 12 is prone to shake, resulting in problems such as irregular shapes of the molded footwear body or inconsistent thickness. If a part of the molded footwear body is too thin, the part is easily damaged, resulting in a short product life.

In order to solve the above problems, in the present embodiment, a positioning member is further provided on the partition plate 11, and cooperates with the bottom of the inner shaping mold 12 to fix the inner shaping mold 12. In the step of isolation, the positioning member on the partition plate 11 clamps and secures the inner shaping mold 12 to maintain the shape of the footwear body forming space.

Generally speaking, the rubber for manufacturing the footwear body is usually different from the rubber for manufacturing the footwear sole. Due to the requirements of some functional footwear, the footwear sole is often required to have better cushioning; and because of aesthetic requirements, the colors of the footwear sole and the footwear body are often required to be different.

The partition plate 11 isolates the footwear body forming space and the footwear sole forming space, and different rubber can be injected into the footwear body forming space and the footwear sole forming space respectively, so that the footwear body can be distinguished from the footwear sole, and the footwear has many possibilities in selecting materials.

In addition, if the footwear body itself and the footwear sole itself need to be partitioned as well, another partition plate 11 may be placed in the footwear body forming space and the footwear sole forming space to divide, according to needs, the footwear body forming space and the footwear sole forming space into several color separation areas, so that the rubber injection process can be flexibly performed for each color separation area, so as to obtain footwear with various functions and higher aesthetics.

S103, Rubber Injection

A predetermined amount of footwear body rubber is injected into the footwear body feed channel 10, and the footwear body rubber is injected into the footwear body forming space from the footwear body rubber injection port through the transfer injection channel 111; then the partition plate 11 is drawn out, and the footwear sole rubber is placed into the footwear sole forming space.

Before rubber injection, the raw rubber and the compounding ingredients are required to be first mixed in proportion in a rubber mixing mill to obtain the required rubber. In the present embodiment, the rubber injection amount required for each pair of finished footwear can be preset on the injection molding machine, such that the injection molding machine can inject a predetermined amount of rubber during the rubber injection process, thereby saving costs.

In the step of rubber injection, the rubber is heated and softened in the rubber injection device before the rubber injection operation. The heated rubber has better fluidity. Therefore, it is easier for the rubber to fill every void in the footwear forming space during the rubber injection process, thereby avoiding the lack of rubber in the finished product.

In the present embodiment, a footwear body feed channel 10 is provided in the forming mold, the footwear body feed channel 10 includes a footwear body rubber injection port, and the footwear body rubber injection port is in communication with the footwear body forming space. The footwear body rubber is injected into the footwear body forming space through the footwear body feed channel 10.

The transfer injection channel 111 is provided in the partition plate 11. In the present embodiment, the transfer injection channel 111 includes the transfer injection inlet and the transfer injection outlet. In the step of isolation, after the partition plate 11 is placed, the transfer injection inlet is in communication with the footwear body rubber injection port, and the transfer injection outlet is in communication with the footwear body forming space.

In addition, a footwear sole feed channel may further be provided in the forming mold, and the footwear sole feed channel is in communication with the footwear sole forming space.

During rubber injection, the footwear body rubber is squeezed into the footwear body feed channel 10 by the feed screw rod in the rubber injection device, and the footwear body rubber is injected into the footwear body forming space through the transfer injection outlet.

Since the partition plate 11 occupies a certain space, if the footwear sole rubber is placed without the partition plate 11 being drawn out, the footwear sole rubber will shrink to a certain extent, and after the partition plate 11 is drawn out, the footwear body rubber and the footwear sole rubber will have different degrees of cross-color, thus affecting the quality of the finished product.

In order to avoid the above problems, in the present embodiment, after the footwear body forming space is filled with the footwear body rubber, the partition plate 11 is driven out by the driving member, and then the footwear sole rubber is placed, thereby ensuring the quality of the finished product.

In addition, in a case that the footwear body and the footwear sole are required to have different materials or colors, the footwear sole rubber can be directly placed into the footwear sole forming space by manual. The footwear sole rubber may be the footwear sole rubber that has a fitted shape after being cut and processed.

In a case that the footwear body and the footwear sole have the same material or color, after the footwear body forming space is filled with the footwear body rubber and the partition plate 11 is drawn out, the footwear body rubber is continuously pressure-injected, so that the whole footwear forming space is filled with the footwear body rubber, and the footwear body rubber is cured in the footwear forming space to form integrated footwear including the footwear sole and the footwear body. In the molded footwear body obtained in this way, the materials of the footwear body and the footwear sole both are the footwear body molding rubber.

In summary, in this step, the material and color of the footwear sole rubber may be the same as or different from that of the footwear body rubber.

Since the footwear body rubber is injected into the footwear body forming space through the transfer injection channel 111 in the partition plate 11 during the rubber injection, there is no trace of rubber injection between the footwear body rubber and the footwear sole rubber after the partition plate 11 is drawn out, and there are no defects on the outer surface of the molded footwear body, thereby ensuring the aesthetics of the product.

In addition, with this rubber injection method, the footwear body rubber and the footwear sole rubber are closely combined, so that the molded footwear body and the molded footwear sole are closely connected to a certain extent, and the quality of the finished product is also greatly improved.

S104, Mold Closing

A mold closing operation is performed to close the forming mold, and the rubber in the footwear forming space is vulcanized and cross-linked to form a molded footwear body.

A mold closing switch is turned on, a hydraulic press is activated, and the hydraulic press applies pressure to close the forming mold and heats the forming mold, so that the rubber in the footwear forming space is vulcanized and cross-linked to form a molded footwear body.

S105, Mold Opening

The hydraulic press is activated to open the forming mold, and the oil cylinder drives the inner shaping mold 12 to move downward, so that the molded footwear body is separated from the outer combined mold 13.

In the present embodiment, the inner shaping mold 12 further includes a first inner mold and a second inner mold.

When installing the forming mold, the first inner mold is fixedly mounted to the outer combined mold, and then the second inner mold is slidably connected with the first inner mold. At the same time, the oil cylinder mounted at the top of the injection molding machine is connected with the second inner mold and drives the second inner mold, thereby controlling the second inner mold to move up and down to realize the merging and separation of the second inner mold and the first inner mold.

In the step of mold opening, the second inner mold is driven to slide away from the first inner mold by the oil cylinder, so as to drive the molded footwear body away from the first inner mold and the outer combined mold 13.

The shape of the inner shaping mold 12 is designed as the simulation of the legs of a human body, which includes a part simulating the lower leg of a human body and the following part. Since the calf and heel of the human body have curvature, and the contact surfaces of the outer combined mold 13 and the inner shaping mold 12 fit with each other, in order to avoid mold opening failure caused by the inner shaping mold 12 getting stuck at the outer combined mold 13 due to the curvature at the calf and heel, the first inner mold and the second inner mold are divided back-forth, that is, the first inner mold and the second inner mold have a back-forth split structure.

The first inner mold includes a part simulating the calf and the heel of a human body, and the second inner mold includes a part simulating the forefoot of a human body. The first inner mold is slidably connected with the second inner mold by a pulley.

When opening the mold, the above design enables the mold opening operation to proceed smoothly.

S106, Rubber Unsticking

Air is blown into the forming mold to bring about gaps between the molded footwear body and the outer combined mold 13 and between the molded footwear body and the inner shaping mold 12.

After the step of mold closing is completed, the injection molding machine automatically blows air to the forming mold to loose the molded footwear body, so that gaps are formed between the molded footwear body and the outer combined mold 13 and between the molded footwear body and the inner shaping mold 12, which facilitates subsequent processing operations.

S107, Demoulding

The molded footwear body is separated from the inner shaping mold 12 to obtain a finished product.

After the step of rubber unsticking, the molded footwear body can be easily peeled off from the inner shaping mold 12 to obtain finished footwear.

In the footwear forming process of the present application, the steps may be flexibly performed according to the function and appearance requirements of the footwear body. In addition, the use of the partition plate 11 in the step of rubber injection can not only realize the application of different materials and colors for the footwear body and the footwear sole, but also ensure that the thickness of the finished footwear body meets the requirements, thereby greatly reducing the defective rate and saving production costs.

Third Embodiment

Figure 3:
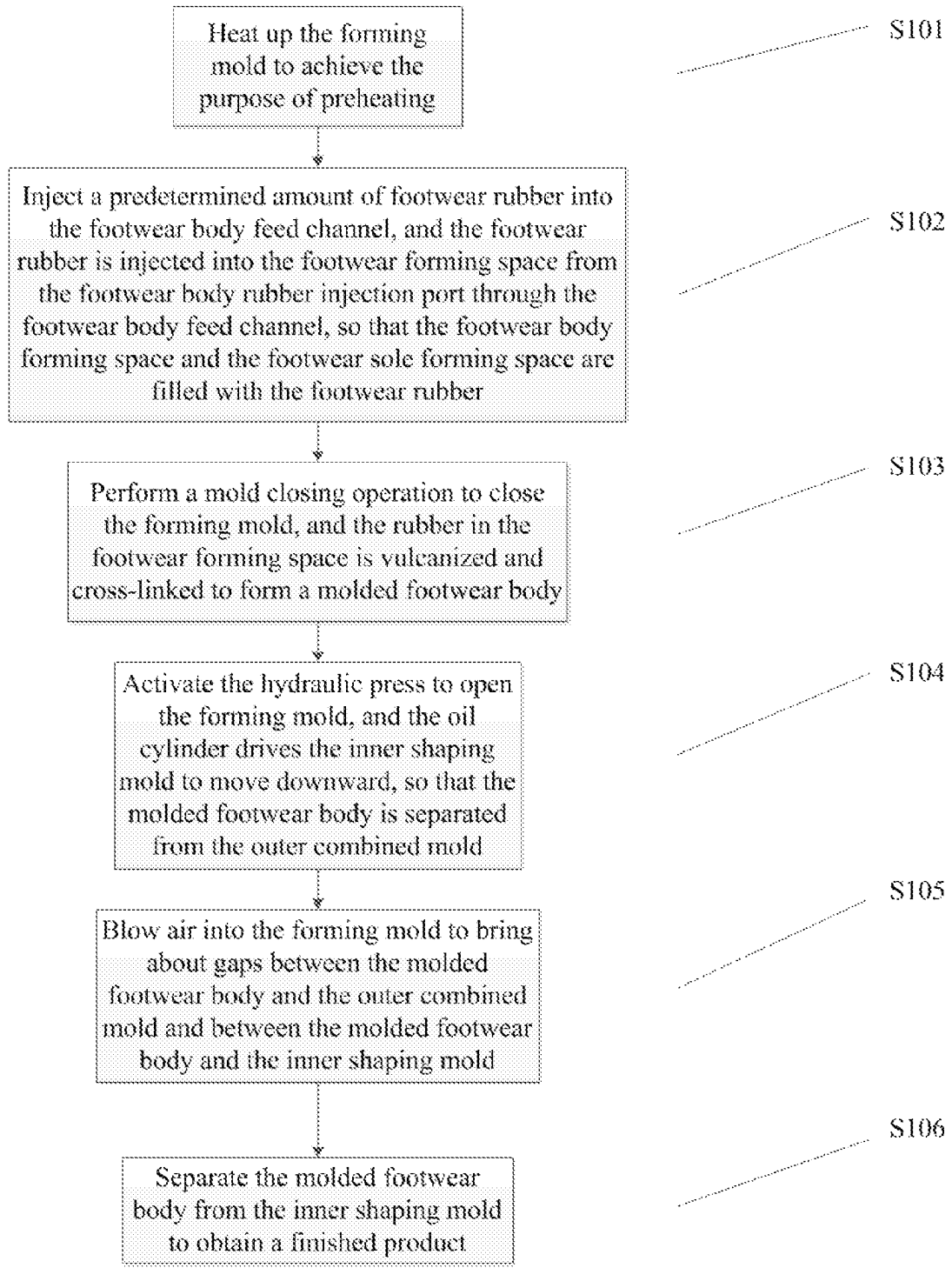
FIG. 3 is a flow chart of the footwear forming process according to a third embodiment of the present application.

Referring to FIG. 3, FIG. 3 is a flow chart of the footwear forming process according to an embodiment of the present application.

Based on the above embodiment, in the present embodiment, the footwear forming process includes the following steps:

S101, Preheating

The forming mold is heated up to achieve the purpose of preheating.

The injection molding machine is activated, and the forming mold is heated by the upper hot plate and the lower hot plate within a predetermined time to achieve the purpose of preheating, so as to facilitate the smooth proceeding of subsequent processing procedures.

S102, Rubber Injection

A predetermined amount of footwear rubber is injected into the footwear body feed channel 10, and the footwear rubber is injected into the footwear forming space from the footwear body rubber injection port through the footwear body feed channel 10, so that the footwear body forming space and the footwear sole forming space are filled with the footwear rubber.

Based on the above embodiments, in the present embodiment, since there is no need to distinguish the footwear body rubber and the footwear sole rubber, the footwear body rubber injection port is in communication with the footwear forming space at the junction of the footwear body forming space and the footwear sole forming space. In the present embodiment, the partition plate 11 is drawn out, so that the footwear body forming space is in communication with the footwear sole forming space to form the footwear forming space.

Before rubber injection, the raw rubber and the compounding ingredients are required to be first mixed in proportion in a rubber mixing mill to obtain the required rubber. In the present embodiment, the rubber injection amount required for each pair of finished footwear can be preset on the injection molding machine, such that the injection molding machine can inject a predetermined amount of rubber during the rubber injection process, thereby saving costs.

In the step of rubber injection, the rubber is heated and softened in the rubber injection device before the rubber injection operation. The heated rubber has better fluidity. Therefore, it is easier for the rubber to fill every void in the footwear forming space during the rubber injection process, thereby avoiding the lack of rubber in the finished product.

In the present embodiment, the footwear body feed channel 10 is provided in the forming mold, the footwear body feed channel 10 includes a footwear body rubber injection port, and the footwear body rubber injection port is in communication with the footwear forming space. The footwear rubber is directly injected into the footwear forming space through the footwear body feed channel 10, so that the entire footwear forming space is filled with the footwear rubber.

During rubber injection, the footwear rubber is squeezed into the footwear body feed channel 10 by the feed screw rod in the rubber injection device, and the footwear rubber is injected into the footwear forming space through the transfer injection outlet.

In summary, in the present embodiment, the footwear body and the footwear sole are integrally formed with the same rubber.

S103, Mold Closing

A mold closing operation is performed to close the forming mold, and the footwear rubber in the footwear forming space is vulcanized and cross-linked to form a molded footwear body.

A mold closing switch is turned on, a hydraulic press is activated, and the hydraulic press applies pressure to close the forming mold and heats the forming mold, so that the rubber in the footwear forming space is vulcanized and cross-linked to form a molded footwear body.

S104, Mold Opening

The hydraulic press is activated to open the forming mold, and the oil cylinder drives the inner shaping mold 12 to move downward, so that the molded footwear body is separated from the outer combined mold 13.

In the present embodiment, the inner shaping mold 12 further includes a first inner mold and a second inner mold.

When installing the forming mold, the first inner mold is fixedly mounted to the outer combined mold, and then the second inner mold is slidably connected with the first inner mold. At the same time, the oil cylinder mounted at the top of the injection molding machine is connected with the second inner mold and drives the second inner mold, thereby controlling the second inner mold to move up and down to realize the merging and separation of the second inner mold and the first inner mold.

In the step of mold opening, the second inner mold is driven to slide away from the first inner mold by the oil cylinder, so as to drive the molded footwear body away from the first inner mold and the outer combined mold 13.

The shape of the inner shaping mold 12 is designed as the simulation of the legs of a human body, which includes a part simulating the lower leg of a human body and the following part. Since the calf and heel of the human body have curvature, and the contact surfaces of the outer combined mold 13 and the inner shaping mold 12 fit with each other, in order to avoid mold opening failure caused by the inner shaping mold 12 getting stuck at the outer combined mold 13 due to the curvature at the calf and heel, the first inner mold and the second inner mold are divided back-forth, that is, the first inner mold and the second inner mold have a back-forth split structure.

The first inner mold includes a part simulating the calf and the heel of a human body, and the second inner mold includes a part simulating the forefoot of a human body. The first inner mold is slidably connected with the second inner mold by a pulley.

When opening the mold, the above design enables the mold opening operation to proceed smoothly.

S105, Rubber Unsticking

Air is blown into the forming mold to bring about gaps between the molded footwear body and the outer combined mold 13 and between the molded footwear body and the inner shaping mold 12.

After the step of mold closing is completed, the injection molding machine automatically blows air to the forming mold to loose the molded footwear body, so that gaps are formed between the molded footwear body and the outer combined mold 13 and between the molded footwear body and the inner shaping mold 12, which facilitates subsequent processing operations.

S106, Demoulding

The molded footwear body is separated from the inner shaping mold 12 to obtain a finished product.

After the step of rubber unsticking, the molded footwear body can be easily peeled off from the inner shaping mold 12 to obtain finished footwear.

Based on the above embodiments, the footwear forming process and the device therefor are provided by the present application. Our commonly used rain boots are divided into two types, one is made of plastic materials and the other is made of rubber materials. Because the injection process on the market is mainly for plastic materials, the rain boots made of plastic materials are mainly produced by plastic injection molding, while the rain boots made of rubber materials are produced by the conventional vulcanization process and mold pressing process. With the footwear forming process and the device therefor provided by the present application, rubber materials can be used to manufacture products by the injection machine, which changes the dominance of the plastic rain boots produced by the injection molding process and is a major breakthrough in the conventional technology. Rubber products that meet the appearance and quality requirements can thereby be obtained. The production quality and efficiency are improved, and market demands are met.

In summary, the above embodiments are only for illustrating the technical solutions of the present application, and are not intended to limit the present application. Although the present application is illustrated in detail with reference to the embodiments described above, it should be understood by those skilled in the art that modification can be made to the technical solutions recited in the embodiments described above, or equivalent substitution can be made onto a part of technical features of the technical solution. The modifications and equivalent replacements will not make the corresponding technical solutions deviate from the scope of the technical solutions of the embodiments of the present application.

The invention claimed is:

1. A rubber injection-molding footwear forming device comprising an injection molding machine, wherein the rubber injection-molding footwear forming device is configured to injection-mold rubber, and further comprises:
a set of forming molds mounted in the injection molding machine, wherein the set of forming molds comprises an outer combined mold and an inner shaping mold;
wherein the inner shaping mold is placed in the outer combined mold, a footwear forming space is formed between the outer combined mold and the inner shaping mold, and the footwear forming space comprises a footwear sole forming space and a footwear body forming space; and a footwear body feed channel is provided in the set of forming molds, the footwear body feed channel comprises a footwear body feed port, and the footwear body feed port is in communication with the footwear forming space, the footwear forming device further comprises a partition plate for separating the footwear body forming space from the footwear sole forming space; the partition plate is movably connected with the outer combined mold, and is insertable between the footwear body forming space and the footwear sole forming space for separation; and a transfer injection channel is provided in the partition plate, wherein the transfer injection channel comprises a transfer injection inlet and a transfer injection outlet; when the partition plate is placed between the footwear body forming space and the footwear sole forming space, the transfer injection inlet is in communication with the footwear body feed port, and the transfer injection outlet is in communication with the footwear body forming space, the transfer injection outlet is located between the footwear body forming space and the footwear sole forming space, and is located at the bottom of the footwear body forming space, a shape of the inner shaping mold simulates the lower leg of a human body including the foot, and the inner shaping mold comprises a first inner mold and a second inner mold; the first inner mold and the second inner mold are divided into front and back; wherein the first inner mold comprises a part simulating the calf and the heel of a human body, and the second inner mold comprises a part simulating the forefoot of a human body; and the first inner mold is fixedly mounted to the outer combined mold, and the second inner mold is slidably connected with the first inner mold.

2. The rubber injection-molding footwear forming device according to claim 1, wherein the outer combined mold is provided with a driving member for driving the partition plate; and the driving member is configured to drive the partition plate to be drawn out from between the footwear body forming space and the footwear sole forming space to merge the footwear body forming space with the footwear sole forming space.

3. The rubber injection-molding footwear forming device according to claim 1, wherein when the partition plate is in an isolation state, the partition plate is in contact with the inner shaping mold.

4. The rubber injection-molding footwear forming device according to claim 1, further comprising an oil cylinder mounted on the top of the injection molding machine, wherein the oil cylinder is connected with the inner shaping mold and configured to drive the inner shaping mold; and the oil cylinder causes the inner shaping mold and the outer combined mold to perform mold closing and mold opening operations by controlling the inner shaping mold.

* * * * *